United States Patent
Rust et al.

(10) Patent No.: US 6,958,111 B2
(45) Date of Patent: Oct. 25, 2005

(54) DIVIDING WALL COLUMN

(75) Inventors: Harald Rust, Neustadt (DE); Gerd Kaibel, Lampertheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 740 days.

(21) Appl. No.: 09/847,299

(22) Filed: May 3, 2001

(65) Prior Publication Data

US 2001/0052453 A1 Dec. 20, 2001

(30) Foreign Application Priority Data

May 4, 2000 (DE) .......................................... 100 21 624

(51) Int. Cl.$^7$ ................................................. B01D 3/16
(52) U.S. Cl. ...................... 202/158; 202/183; 202/184; 202/197; 202/208; 202/199; 202/267.1; 202/270; 202/254
(58) Field of Search ................................ 202/158, 183, 202/184, 197, 208, 199, 267.1, 270, 254

(56) References Cited

U.S. PATENT DOCUMENTS

| | | | | |
|---|---|---|---|---|
| 2,471,134 A | * | 5/1949 | Wright ....................... 196/111 |
| 4,230,533 A | * | 10/1980 | Giroux ........................... 203/1 |
| 5,755,933 A | * | 5/1998 | Ognisty et al. ............. 202/158 |
| 5,785,819 A | * | 7/1998 | Kaibel et al. ............... 202/158 |
| 5,914,012 A | * | 6/1999 | Kaibel et al. ............... 202/158 |
| 6,387,222 B1 | * | 5/2002 | Tragut et al. .................. 203/2 |
| 6,551,465 B1 | * | 4/2003 | Van Zile et al. ............ 202/158 |
| 6,558,515 B1 | * | 5/2003 | Steacy ........................... 203/1 |
| 6,645,350 B1 | * | 11/2003 | Steacy ........................ 202/158 |

FOREIGN PATENT DOCUMENTS

| | | |
|---|---|---|
| DE | 33 02 525 | 7/1984 |
| DE | 43 36 983 | 5/1995 |
| DE | 43 36 986 | 5/1995 |
| EP | 0 804 951 | 11/1997 |

\* cited by examiner

*Primary Examiner*—N. Bhat
(74) *Attorney, Agent, or Firm*—Novak Deuce & Quigg

(57) ABSTRACT

In a dividing wall column comprising as segments
  a) an upper column region (6),
  b) an inflow section (7),
  c) an offtake section (8) and
  d) a lower column region (9), the inflow section b) (7) and the offtake section c) (8) are separated from one another laterally by a dividing wall (10) fixed in the column and the dividing wall (10) is located between the upper column region a) (6) and the lower column region d) (9). The present invention provides for the dividing wall (10) to be constructed at least partly of an elastic material, the dividing wall (10) to have a slightly overdimensional width and the dividing wall (10) to be fixed in the column by the dividing wall exercising an elastic recovery force on the interior wall of the column. The dividing wall can easily be installed in, in particular, relatively small columns.

16 Claims, 4 Drawing Sheets

DIVIDING WALL COLUMN

The present invention relates to a dividing wall column. In the fractionation of feed mixtures into more than two pure fractions, e.g. into low boilers, intermediate boilers and high boilers, it is normally necessary to use a plurality of distillation columns. To limit the outlay in terms of apparatus, the fractionation of multicomponent mixtures consisting of more than two components is carried out using columns which are suitable for taking off liquid and gaseous media at the side. However, the use of distillation columns having side offtakes is restricted by the fact that products taken off at the side offtakes are normally not completely pure. In the case of products taken off at side offtakes in the rectification section of a distillation apparatus, which are usually taken off in liquid form, the side products still contain proportions of low-boiling components which are normally taken off at the top. The same applies to products taken off at side offtakes in the stripping section, which are usually taken off in vapor form and still contain proportions of the low boiler. When such conventional side offtake columns are used, contaminated side products are virtually always obtained. The use of side offtake columns is therefore unsuitable for the isolation of pure substances. To isolate intermediate-boiling pure substances from multicomponent mixtures, in particular, it is therefore generally necessary to employ column arrangements comprising at least two separate columns. An advantageous alternative is provided by dividing wall columns or thermally coupled distillation columns. The use of these makes it possible to isolate side products, i.e. intermediate-boiling components, in pure form from multicomponent mixtures. A dividing wall column is in principle a simplification of a system of thermally coupled distillation columns. In dividing wall columns, a dividing wall is located in the middle region. This extends to above and to below the feed point. On the other side, located opposite the feed point, at least one side offtake is located at the same height as, above or below the feed point. The dividing wall is located between the side offtake and the feed point. This dividing wall is generally vertical. In the region of the column which is divided by the dividing wall, lateral mixing of liquid and vapor streams is not possible. As a result, the total number of distillation columns required for fractionating multicomponent mixtures is reduced. A dividing wall column generally has the following segments:

an upper column region located above the dividing wall,
an inflow section located on the side of the feed point and bounded laterally by a dividing wall,
an offtake section located on the side of the side offtake and bounded laterally by the dividing wall and
a lower column region located below the dividing wall.

Compared to the arrangement of conventional distillation columns, dividing wall columns and thermally coupled columns offer advantages in respect of both energy consumption and capital costs and are therefore preferably used in industry. Thermally coupled distillation columns or dividing wall columns used for distillation purposes are generally configured as packed columns containing random packing elements or ordered packing or as tray columns.

The use of dividing wall columns is advantageous in terms of energy consumption and capital costs.

In the case of dividing wall columns used in industry, it is usual, as described in DE-A-43 36 983, to weld the dividing wall into the interior wall of a column. This makes it necessary to adhere to tight manufacturing tolerances so that the dividing wall seals the inflow section as completely as possible from the offtake section—leaks between dividing wall and interior wall of the column cause undesirable mass transfer between the inflow section and the offtake section, as a result of which the purity of the products obtained is adversely affected. To adhere to the necessary tight tolerances, a different method of manufacture in which half-cylindrical shells are welded onto the dividing wall as described in DE-A-43 36 986 is generally employed in the manufacture of dividing wall columns which have a diameter of less than about 0.8 m.

The abovementioned methods of manufacture are complicated, particularly for the construction of small dividing wall columns, and are, in particular, not suitable for the construction of dividing wall columns which have a diameter of less than 0.2 m. These production methods are therefore time-consuming and costly or unsuitable for, in particular, laboratory columns, pilot plant columns and relatively small production columns.

It is an object of the present invention to provide a dividing wall column whose dividing wall is fixed in place simply and effectively. The corresponding fixing mechanism should, in particular, be advantageous in the manufacture of small dividing wall columns.

The achievement of this object starts out from a dividing wall column comprising as segments
a) an upper column region,
b) an inflow section,
c) an offtake section and
d) a lower column region,
where the inflow section b) and the offtake section c) are separated from one another laterally by a dividing wall fixed in the column and the dividing wall is located between the upper column region a) and the lower column region d).

We have found that the object of the present invention is achieved by the dividing wall being constructed at least partly of an elastic material, the dividing wall having a slightly overdimensional width and the dividing wall being fixed in the column by the dividing wall exercising an elastic recovery force on the interior wall of the column.

For the purposes of the present invention, an elastic material is one which can be reversibly deformed. Nonelastic materials are, for example, glass or ceramics. In the case of an elastic material, a recovery force is generated in the body comprising the elastic material after deformation of the body and this recovery force continues to exist until the body resumes its original shape (until the deformation is released).

For the purposes of the present invention, the dividing wall having a slightly overdimensional width generally means that the dividing wall is slightly wider than the internal diameter of the column (this applies to symmetrical, cylindrical columns—the normal case). A slight overdimension is, in the present context, an overdimension of up to about 5% of the internal diameter of the column. The slight overdimension of the dividing wall causes, on installation, compression of the dividing wall which is generally shown by a slight curvature of the dividing wall.

The dividing wall is fixed in the column by the dividing wall exercising an elastic recovery force on the interior wall of the column. This generally means that both lateral edges of the dividing wall are in contact with the interior wall of the column and the dividing wall is slightly bent, i.e. it is compressed and is thus under a compressive stress, as a result of which the dividing wall is in practical terms firmly clamped in the column. The seal between the dividing wall and the interior wall of the column is thus produced by the "spring action" of the slightly overdimensional dividing wall. The appropriate fits are specified in accordance with customary construction principles and are determined by the construction type of the dividing wall, its stiffness and the manufacturing tolerance of the interior wall of the column.

The particular advantage of the dividing wall column of the present invention is that it can be produced simply and inexpensively—the dividing wall can easily be installed and removed. The dividing wall can readily be installed, in particular, in small columns such as laboratory columns or pilot plant columns. Since the dividing wall is also easy to remove from the column, the column can easily be reconfigured.

The dividing wall is usually constructed entirely of an elastic material.

The dividing wall is generally a strip manufactured in one piece.

The material of which the dividing wall is constructed frequently comprises plastic, for example polytetrafluoroethylene. The dividing wall can also consist entirely of plastic.

The material of which the dividing wall is constructed frequently comprises corrosion-resistant metallic materials, e.g. chromium/nickel-containing stainless steels. The dividing wall can consist entirely of metallic materials.

The lateral edges of the dividing wall are frequently chamfered, with the angle of the chamfer preferably being from 20 to 60°. Particular preference is generally given to a chamfering angle of from 30 to 45°. The chamfering reduces the stiffness in the edge region and results in an improved seal.

In the column, the dividing wall is generally straight or bent into a Z or U shape. If the dividing wall is bent into a Z or U shape, the middle region of the dividing wall is essentially straight (or only slightly curved) with only the edges which are in contact with the interior wall of the column being correspondingly deformed. The Z- or U-shaped bending of the dividing wall makes it possible to tolerate a greater degree of out-of-roundness of the interior column wall, since better sealing is ensured by the Z or U shape of the dividing wall.

The manufacturing tolerance of the internal diameter of the column is usually <1.5 mm, preferably <1 mm.

The dividing wall is frequently constructed entirely of a metallic material and the thickness of the dividing wall is from 0.05 to 1 mm, preferably from 0.1 to 0.3 mm. On the other hand, the dividing wall can be constructed entirely of plastic and the thickness of the dividing wall is then generally from 1 to 10 mm, preferably from 2 to 5 mm. The thickness of the dividing wall is determined in principle by the need for the dividing wall to be sufficiently strong and stiff but still flexible.

For installation, the dividing wall having a length of generally up to 3 m is drawn into the column—the dividing wall is drawn into the column section or into a plurality of column sections above one another.

BRIEF DESCRIPTION OF THE DRAWINGS

FIG. 1 and FIG. 2 schematically depict the fractionation of a starting mixture consisting of low boiler 1, intermediate boiler 2 and high boiler 3 in a dividing wall column. In FIG. 2, the intermediate boiler 2 consists of two components 4, 5. The segments present in the dividing wall column are an upper column region 6, an inflow section 7, an offtake section 8 and a lower column region 9. The column is divided in the middle by the dividing wall 10. FIG. 6 schematically shows the chamfered edge of a dividing wall, with the angle of chamfer 11 being indicated.

Figure 1:
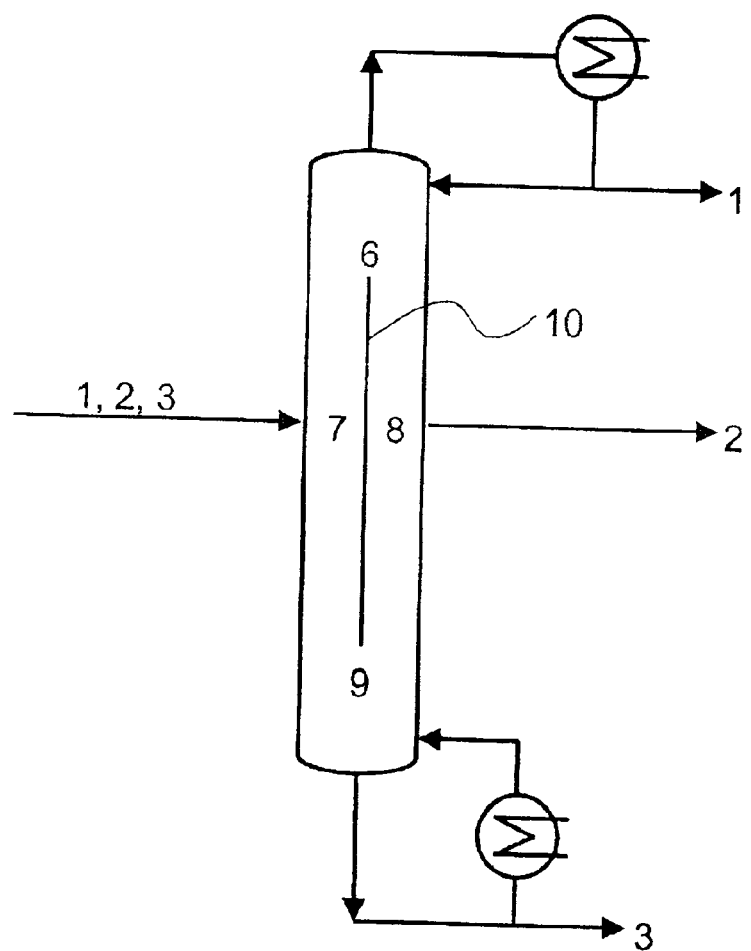
FIG. 1 and FIG. 2 schematically show dividing wall columns.
Figure 2:
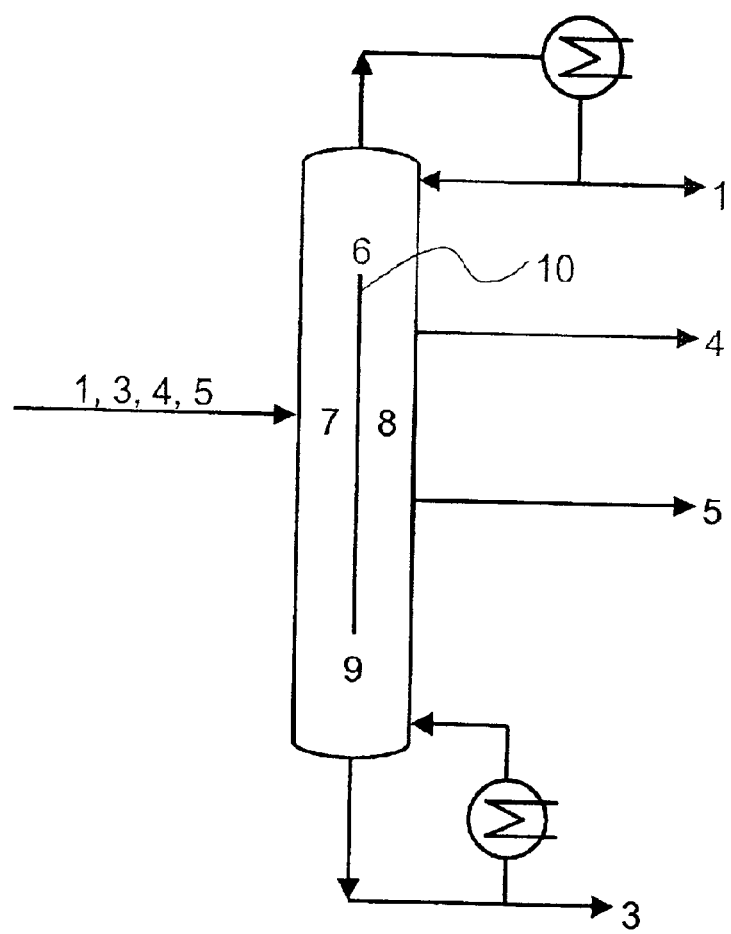
Figure 3:
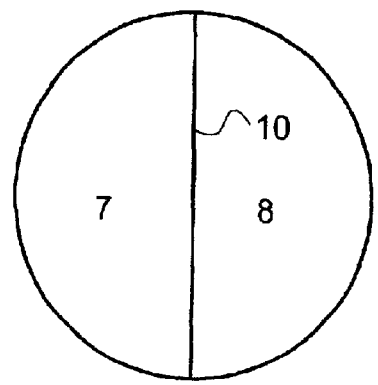
FIG. 3 shows a straight dividing wall installed in the column.
Figure 4:
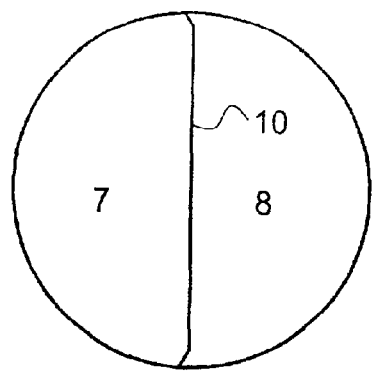
FIG. 4 shows a dividing wall bent into a U shape in the column.
Figure 5:
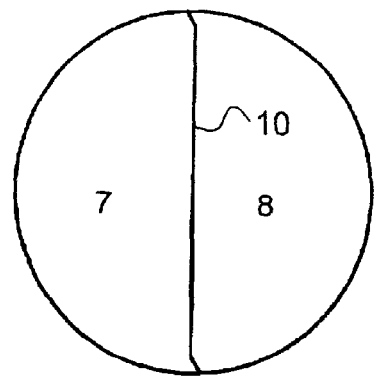
FIG. 5 shows a dividing wall bent into a Z shape in the column.
Figure 6:
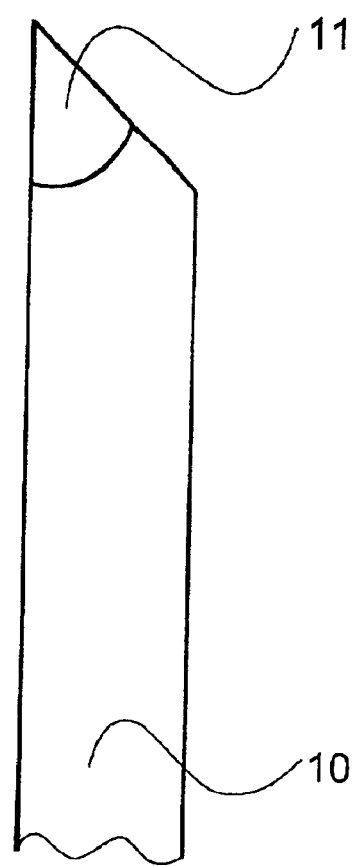
FIG. 6 shows a chamfered edge of a dividing wall.

The invention is illustrated by the examples below.

EXAMPLES

Columns having diameters of 43 mm, 65 mm, 80 mm, 135 mm and 170 mm were manufactured. The column walls consisted of glass. The flexible, flat dividing walls were made from stainless steel 1.4571. The thickness of the dividing walls was matched to the column diameter. At a column diameter of 43 mm it was 0.1 mm, at a column diameter of 65 and 80 mm it was 0.1 mm and at a column diameter of 135 and 170 mm it was 0.25 mm. The overdimension of the dividing walls relative to the column diameter was 0.8 mm at the column diameter of 43 mm, was 1.0 mm at the column diameters of 65 and 80 mm and was 1.5 mm at the column diameters of 135 and 170 mm. The dividing walls were not chamfered at the sides. A good seal against the column wall was achieved and it was even possible to dam up liquid on one side for a period of more than 2 hours. As separation internals, use was made of wire mesh rings, Raschig rings and mesh packing made of metal. The separation performance was as good as that in the case of dividing wall columns which have permanently built-in dividing walls and are costly to produce.

We claim:

1. A dividing wall column comprising as segments
   a) an upper column region,
   b) an inflow section,
   c) an offtake section and
   d) a lower column region,
where the inflow section b) and the offtake section c) are separated from one another laterally by a dividing wall fixed in the column and the dividing wall is located between the upper column region a) and the lower column region d), wherein the dividing wall is constructed at least partly of an elastic material, the dividing wall has a slightly overdimensional width and the dividing wall is fixed in the column by the dividing wall exercising an elastic recovery force on the interior wall of the column.

2. A dividing wall column as claimed in claim 1, wherein the dividing wall is constructed entirely of an elastic material.

3. A dividing wall column as claimed in claim 1, wherein the dividing wall is a strip manufactured in one piece.

4. A dividing wall column as claimed in claim 1, wherein the material of which the dividing wall is constructed comprises plastic.

5. A dividing wall column as claimed in claim 1, wherein the material of which the dividing wall is constructed comprises corrosion-resistant metallic materials.

6. A dividing wall column as claimed in claim 1, wherein the lateral edges of the dividing wall are chamfered.

7. A dividing wall column as claimed in claim 1, wherein the dividing wall is straight or bent into a Z or U shape when installed in the column.

8. A dividing wall column as claimed in claim 1, wherein the manufacturing tolerance of the internal diameter of the column is less than 1.5 mm.

9. A dividing wall column as claimed in claim 1, wherein the dividing wall is constructed entirely of a metallic material and the thickness of the dividing wall is from 0.05 to 1 mm.

10. A dividing wall column as claimed in claim 1, wherein the dividing wall is constructed entirely of plastic and the thickness of the dividing wall is from 1 to 10 mm.

11. A dividing wall column as claimed in claim 4, wherein the plastic is polytetrafluoroethylene.

12. A dividing wall column as claimed in claim 5, wherein the corrosion-resistant metallic materials are chromium-nickel-containing stainless steels.

13. A dividing wall column as claimed in claim 6, wherein the lateral edges of the dividing wall have an angle of chamfer of from 20 to 60°.

14. A dividing wall column as claimed in claim 8, wherein the manufacturing tolerance is less than 1 mm.

15. A dividing wall column as claimed in claim 9, wherein the thickness of the dividing wall is from 0.1 to 0.3 mm.

16. A dividing wall column as claimed in claim 10, wherein the thickness of the dividing wall is from 2 to 5 mm.

* * * * *